United States Patent [19]
Langer

[11] 3,946,435
[45] Mar. 23, 1976

[54] RECORDING AND PLAYBACK APPARATUS

[75] Inventor: Erich Langer, Vienna, Austria

[73] Assignee: U.S. Philips Corporation, New York, N.Y.

[22] Filed: July 24, 1974

[21] Appl. No.: 491,560

[30] Foreign Application Priority Data
Aug. 1, 1973 Austria .................................. 6773/73

[52] U.S. Cl. ........................ 360/14; 360/70; 360/73
[51] Int. Cl.² ............................................. H04N 5/78
[58] Field of Search ............. 360/14, 70, 73, 61, 62, 360/63; 178/6.6 P, 6.6 D

[56] References Cited
UNITED STATES PATENTS

| | | | |
|---|---|---|---|
| 3,402,257 | 9/1968 | Lange | 360/70 |
| 3,542,949 | 11/1970 | Tanaka et al. | 360/14 |
| 3,600,508 | 8/1971 | Dann et al. | 360/14 |
| 3,636,252 | 1/1972 | Kowal | 360/14 |
| 3,654,398 | 4/1972 | Louth | 360/14 |
| 3,666,883 | 5/1972 | Yamo et al. | 360/73 |
| 3,671,665 | 6/1972 | Kosaka | 360/14 |
| 3,686,432 | 8/1972 | Deguchi et al. | 360/70 |
| 3,742,132 | 6/1973 | Sanguu et al. | 178/6.6 P |
| 3,772,468 | 11/1973 | Tatsuguchi | 178/6.6 P |

Primary Examiner—Raymond F. Cardillo, Jr.
Attorney, Agent, or Firm—Frank R. Trifari; Simon L. Cohen

[57] ABSTRACT

In a recording and playback apparatus the tachometer of the servo system for controlling the speed of the drive shaft uses a disc with a closed magnetizable track, which cooperates with an even number of equidistantly spaced magnetic heads connected to a direct voltage source in the playback mode. Each head successively magnetizes the track in an opposite sense. One of the heads scans the magnetizations stored in the track for supplying the input signal for the servo system during a recording. When a new recording is made which is to follow an existing recording, the magnetic heads are disconnected from the direct voltage source, and switching from the playback to the recording mode is effected by means of a switching device which can be controlled by the pulses scanned from a synchronization track on the record carrier.

4 Claims, 3 Drawing Figures

RECORDING AND PLAYBACK APPARATUS

The invention relates to a recording and playback apparatus for video signals, comprising a drive shaft for moving a record carrier, a servo system for controlling the speed of rotation of the drive shaft and a tachometer connected thereto for supplying a tachometer signal, the frequency of which is proportional to the instantaneous speed. In the Recording mode pulses which are locked to the vertical synchronization pulses of the signal to be recorded are recorded in a separate synchronization track on the record carrier and pulses which are locked to the vertical synchronization pulses of the signals to be recorded are applied to the servo system as the reference signal and the tachometer signal supplied by the tacho-generator as the variable input signal. In the Playback mode a reference signal derived from a reference signal source is applied to the servo system and the pulses which are read from the synchronization track are applied as available input signal. For uninterruptedly joining a new recording to an existing recording at an arbitrary point on a record carrier the Playback mode is used as the starting mode. In this case, pulses which are locked to the vertical synchronization pulses of the signal to be recorded are applied to the servo system as the reference signal. In such an apparatus a new recording on the record carrier should follow the existing recording in such a way that at the transistion from the existing recording to the new recording the disturbance of the picture is minimal, i.e. that the disturbance of the synchronization is minimal and the new synchronization signals to be recorded on the record carrier continuously follow the synchronization signals already present. The major cause of a picture disturbance of the type is that at the transition to a new recording the servo system suddenly receives a different variable input signal, which may give rise to a substantial phase transient. In order to avoid such problems, it is known (for example from U.S. Pat. No. 3,636,252) to provide a tachometer, which supplies a multiplicity of pulses per revolution. These pulses are referred to the pulses read from the synchronization track, from which a control parameter is derived, which upon initiating a new recording from the multiplicity of pulses applied by the tachometer selects that pulse as the next pulse for the measuring signal of the servo system, which at that instant directly follows the pulse which is read from the synchronization track, after which the measuring signal is subsequently also derived from the pulses from the tachometer.

It is an object of the invention to solve the above-mentioned problems in a very simple manner with respect to the technology and circuit design of an apparatus of the type mentioned in the preamble. For this, the invention is characterized in that a tachometer a disc with a closed magnetizable track is provided. The track cooperates with an even number of equidistantly spaced magnetic heads, which exclusively in the Playback mode are connected to a direct voltage source and which successively magnetize the track in an opposite sense. One of the said heads scanning the magnetic recordings stored in the track for supplying the variable input signal during a recording. A switching device is provided which is controllable with the aid of the pulses read from the synchronization track. The switching device, upon initiation of a new recording disconnects the magnetic heads from the direct voltage source when the next following pulse is read from the synchronization track and switches over from the Playback mode to the Recording mode. Thus it is achieved that upon initiation of a new recording the first pulse which is read from the synchronization track directly defines the next pulse for the measuring signal of the servo system, after which the subsequent pulses, derived from the tachometer signal, follow continuously as defined by the magnetic recordings stored in the magnetizable track at the instant that the above-mentioned pulse which is read from the synchronization track occurs. If the switching device has a short response time, the time from the scanning of the relevant pulse from the synchronization track until the appearance of the next pulse from the tachometer substantially equals the time which corresponds to one period of the pulse train of the variable input signal during prior reproduction, so that no phase transient occurs at the transition from the Playback mode to the Recording mode. It will be obvious that the number of magnetic heads must be selected so that the pulse train scanned by the one magnetic head has a frequency with a fixed relationship to the frequency of the pulse train recorded on the synchronization track.

For a simple construction of the tachometer the magnetic heads and the switch of the switching device are connected in series between the direct voltage source and a reference potential, while the magnetic head which is connected to the reference potential is used for supplying the variable input signal.

When making a new recording it is also of importance that the pulse train in the synchronization track on the record carrier is continued uninterruptedly; it is for example possible to employ pulses for this purpose, which pulses are locked to the vertical synchronization pulses of the new signal to be recorded. However, it has been found to be particularly favorable when at least during a new recording the measuring signal for the servo-system is recorded in the synchronization track. This also prevents disturbances which may occur as a result of tolerances in the geometry of individual apparatusses when a recording which is made on one apparatus is continued on another apparatus.

In respect of ease of operation of the apparatus it is found to be advantageous when a recording and a new recording can be started with one and the same control element, and when for controlling the switching device apart from the pulses which are read from the synchronization track a replacement pulse source is provided for this, which supplies at least one pulse to the switching device when no pulses are present in the synchronization track when a new recording is started.

The invention will be described in more detail with reference to the accompanying schematic drawings, which show some embodiments to which the scope of the invention is not limited.

Figure 1:
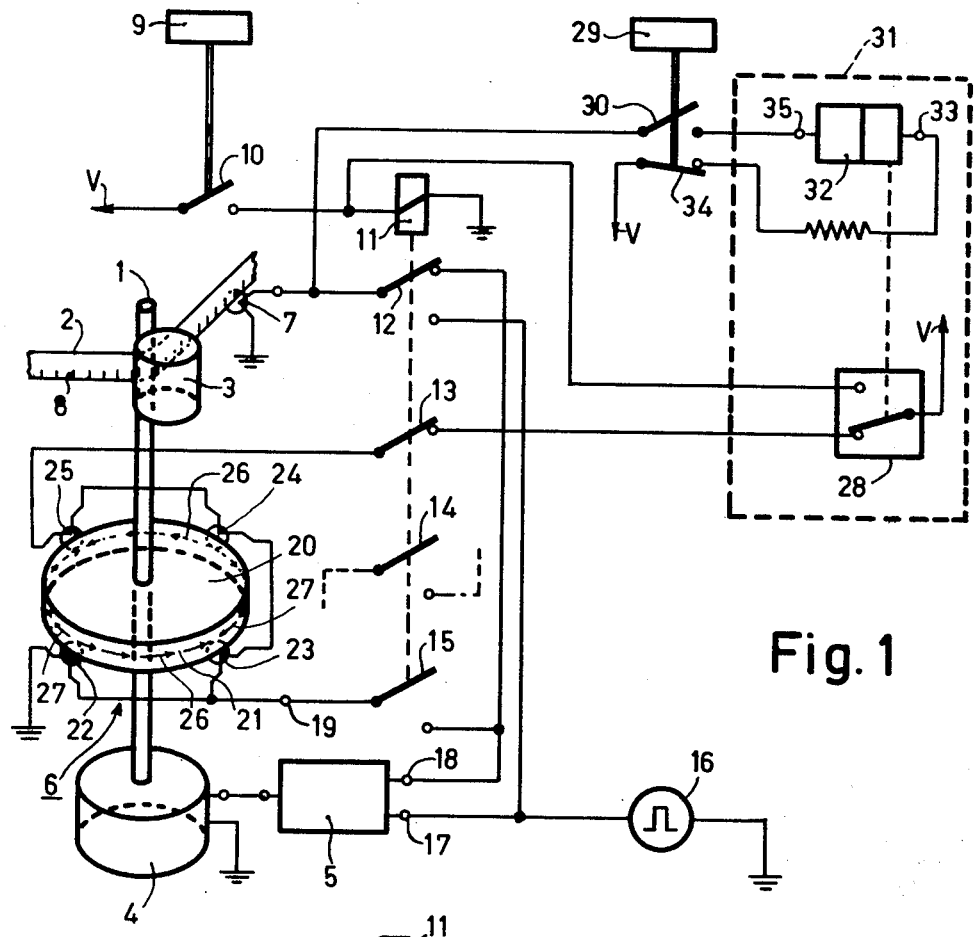
FIG. 1 shows an apparatus in which an arbitrary recording and a new recording which follows an existing recording at an arbitrary point can be started with separate controls.

In FIG. 1 the reference numeral 1 denotes a drive shaft with which a record carrier 2 in the form of a tape can be advanced in conjunction with the pressure roller 3. The drive shaft is driven by a motor 4, which is controlled by the servo system 5 for controlling the speed of rotation of the drive shaft. Connected to the drive shaft is a tachometer 6 for supplying a pulse train which is proportional to the instantaneous speed of rotation thereof. A magnetic head 7 cooperates with the record carrier 2 and scans the track 8 which extends in the longitudinal direction of the record carrier for recording and reproducing synchronization pulses respectively. A control 9 is provided for switching the apparatus between the Recording and the Playback mode; FIG. 1 represents the Playback mode. By means of said control 9 a switch 10 can be actuated, which by the application of a voltage V controls a relay 11 or a corresponding electronic switching device, which in its turn controls the switches 12, 13, 14 and 15. The switches 12, 13, 14 and 15 are associated with the servo system; the further switch 14 symbolically represents that in the apparatus still other switching processes are performed, such as for example switching over the amplifiers which process the video signal. Finally, a reference signal source 16 is provided, by which pulses are applied to the servo system. These pulses have been derived either from the vertical synchronization pulses of a video signal or from the mains voltage, while an automatic switching means may be provided which ensures that if no vertical synchronization pulses are available the pulses are derived from the mains voltage. All further components of the apparatus are not shown, because they are irrelevant for the present invention. This also applies to separator stages, auxiliary amplifiers and further similar devices usually found in equipment of this type.

In the Play-back mode the pulses from the reference signal source 16 are applied to the servo system 5 via its input 17 as the reference signal and the pulses which are scanned from the synchronization track 8 with the magnetic head 7 as the variable input signal via its input 18.

In the Recording mode pulse which are now necessarily locked to the vertical synchronization pulses of the video signal to be recorded and which are derived from the reference signal source 16 are applied to the servo system via its input 17 as the reference signal, and pulses appearing at the output 19 of the tachometer 6 are applied via its input 18 as the variable input signal. Simultaneously, the pulses of the reference signal are recorded in the synchronization track 8 by means of the magnetic head 7.

The tachometer consists of a disc 20 which is connected to the drive shaft 1. At the circumference of the disc a closed magnetizable track 21 is disposed with which four equidistantly spaced magnetic heads 22, 23, 24 and 25 cooperate. Said magnetic heads are connected to a direct voltage source V in the Playback mode only and successively magnetize the track 21 in an opposite sense, so that as the disc rotates four consecutive zones of alternately opposite magnetization are obtained in the track 21, as is schematically indicated by the arrows 26 and 27. The transitions from one direction of magnetization to the opposite direction, which are of course stationary relatively to the magnetic heads, then move along the track 21 against the direction of rotation of the disc, viewed from the rotating disc, and thus characterize a certain phase of the rotary system relative to the pulses which are read from the synchronization track. It is effective to connect the magnetic heads in series, the series connection being connected to the direct voltage source V via the switch 13 and a further switch 28, to be further described hereinafter.

When the apparatus is set to a different mode, for example, Stop or Fast Winding, the magnetic heads are disconnected from the direct voltage source in a manner not shown, the last magnetizations with the four transitions of the directions of magnetization being retained in the track 21. When a recording is started the relay 11 is actuated and thus opens the switch 13, so that also in this mode there is no current through the magnetic head and the last magnetizations of the track 21 remain intact. In this mode the magnetic head 22 which is connected to the reference potential serves as scanning head for the track 21, the connection point of the magnetic heads 22 and 23 constituting the output 19 of the tachometer. As the disc rotates, the magnetic head 22 supplies a pulse each time that the direction of magnetisation in the track 21 is reversed, i.e. when the head passes a transition. The pulse is applied to the input 18 of the servo system as the variable input signal via the switch 15 which is now closed. Therefore, the transitions from one direction of magnetization to the opposite direction have a similar effect to the magnets which are rigidly disposed on a disc in known tachometers; in contradistinction to said magnets, however, the transitions in the Playback mode continually change place viewed from the rotating disc, so that they are always in a fixed relationship with the pulses which are scanned from the synchronization track.

To ensure that a new recording follows an existing recording on the record carrier at an arbitrary point without interruption the Playback mode is taken as the starting mode. Pulses which are now necessarily locked to the vertical synchronization pulses of the signal to be recorded and derived from the reference signal source 16 being applied to the servo system as the desired signal via its input 17. Thus, the servo system is synchronized in accordance with the vertical synchronization pulses of the signal to be recorded at a later instant and is thus prepared for a new recording. In the track 21 during the playback mode a magnetization pattern of four areas that are oppositely magnetically polarized is recorded by the magnetic heads 22, 23 and 25, as described, the previous magnetizations being erased. The magnetic pattern remains stationary with respect to the heads during the playback mode.

For starting a new recording a control 29 is provided which, when it is actuated, closes a first switch 30, so that the pulses which are scanned from the synchronization track are supplied to a switching device 31. The switching device 31, which to ensure rapid switching suitably consists of electronic elements, comprises a bistable multibibrator 32, which in the Playback mode is maintained in a specific state, in which it receives a corresponding bias voltage V at its one control input 33 via the further switch 34, which can be actuated by the control 29. The other control input 35 of the bistable multivibrator constitutes the input of the switching device, to which via the switch 30 the pulses scanned from the synchronization track can be applied. The bistable multivibrator 32 in its turn controls the switch 28, which in the Playback mode connects the magnetic head 22, 23, 24 and 25 to the direct voltage source V. When the switch 28 is actuated, which is the case when the bistable multivibrator 32 changes over to its other state, switch 28 interrupts the connection between the magnetic heads and the direct voltage source and subsequently connects the relay 11 to the direct voltage source V, so that said relay is actuated and changes over from the Playback mode to the Recording mode. The bistable multivibrator 32 is changed over from its given state in the Playback mode to the other state, in which the Recording mode is switched on, by the next pulse which is scanned from the synchronization track 8 following the closure of the switch 30.

Thus, when initiating a new recording by the actuation of the control 29 the magnetic heads are directly disconnected from the direct voltage when the next pulse is scanned from the synchronization track upon the closure of the switch 30, so that the magnetization or transitions from one direction of magnetization to the opposite direction then present in the track 21 are stored, i.e. the magnetization pattern which until that instant was stationary begins to rotate in accordance with the speed of rotation of the disc. After the change from the Playback mode to the Recording mode, the magnetizations which are stored in the track 21 then provide the variable input signal for the servo system. Thus, the scanning of the pulse from the synchronization track, which pulse at this instant in the Playback mode still belongs to the variable input signal, defines the next pulse of the variable input signal supplied by the tachometer in the Recording mode, the further pulses then following continuously. For a negligible response time of the switching device the time interval from instant of scanning of the relevant pulse from the synchronization track until the next pulse from the tacho-generator then equals the time which corresponds to one period of the pulse train of the measuring signal during previous playback. Viewed from the servo system, the measuring signal during a new recording is an uninterrupted continuation of the previous measuring signal during playback, so that no phase transient occurs between the two signals and consequently the picture is not disturbed.

During the new recording which is now being made, which follows the existing recording on the record carrier without interruption, the magnetic head 7 via the switch 12 is connected to the reference signal source 16 which supplies the reference signal for the servo system, so that pulses derived from the vertical synchronization pulses of the new signals to be recorded are recorded in the synchronization track 8. On the basis of the above described operation of the servo system it is also guaranteed that the newly recorded vertical synchronization pulse continuously follow the pulses of the original synchronization signal already contained on the record carrier.

In this respect it has appeared to be advantageous when during a new recording, instead of the reference signal supplied by the reference signal source 16, the variable input signal for the servo system is recorded in the synchronization track as the new synchronization signal. This ensures that phase transients as a result of tolerances in the geometry of the individual apparatuses are also avoided, which transients arise when a recording made on one apparatus is continued on another apparatus. This is because the pulses supplied by the tachometer are in a fixed relationship to the pulses which are scanned from the synchronization track, so that also allowance is made for timing errors between the pulse trains which depend of the record carrier transport. This step is employed to special advantage when an apparatus comprises a phase shifter for the compensation of tolerances in the geometry of an apparatus and variations in the dimensions of the record carrier for accordingly influencing the reference signal for the servo system.

Figure 2:
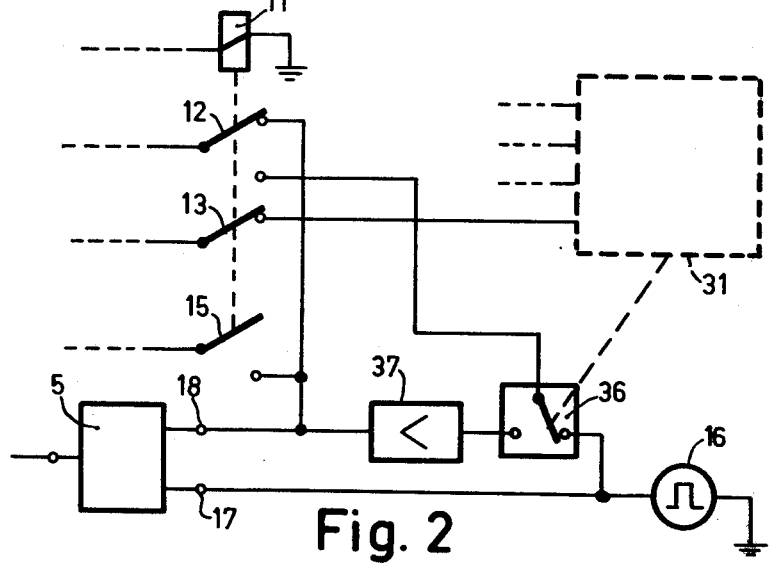
FIG. 2 shows a detail of a modification of the embodiment of FIG. 1, in which during a new recording the measuring signal of the servo-system is recorded in the synchronisation track.

FIG. 2 shows a circuit detail relating to this, which is adapted to the circuit elements of the embodiment of FIG. 1, which in this case are not shown. The line from the switch 12 to the input 17 of the servo system includes a further switch 36 which can be controlled by the switching device 31, which upon actuation of the switching device interrupts the connection of this line to the input 17 of the servo system and instead connects the line to the output of an amplifier 37, whose input is connected to the input 18 of the servo system. Thus, the reference signal which appears at the input 17 of the servo system during an arbitrary recording is recorded in the synchronization track and during a new recording, which follows a recording at a specific point, the variable input measuring signal available at the input 18 of the servo system is recorded.

The embodiment of FIG. 3 again comprises a drive shaft 1 which is driven by a motor 4. For controlling the speed of the drive shaft the servo system 5 acts as an eddy current brake 38, which consists of a brake solenoid 39 which is fed by the servo system and a brake disc 40 which is connected to the drive shaft. With the magnetizable track 21 on the disc 20 of the tachometer 6 two diametrically disposed magnetic heads 22 and 23 cooperate, so that the track 21 contains two zones with opposite directions of magnetizable 26 and 27. The switching device 31 is of similar design so that in the embodiment of FIG. 1.

Figure 3:
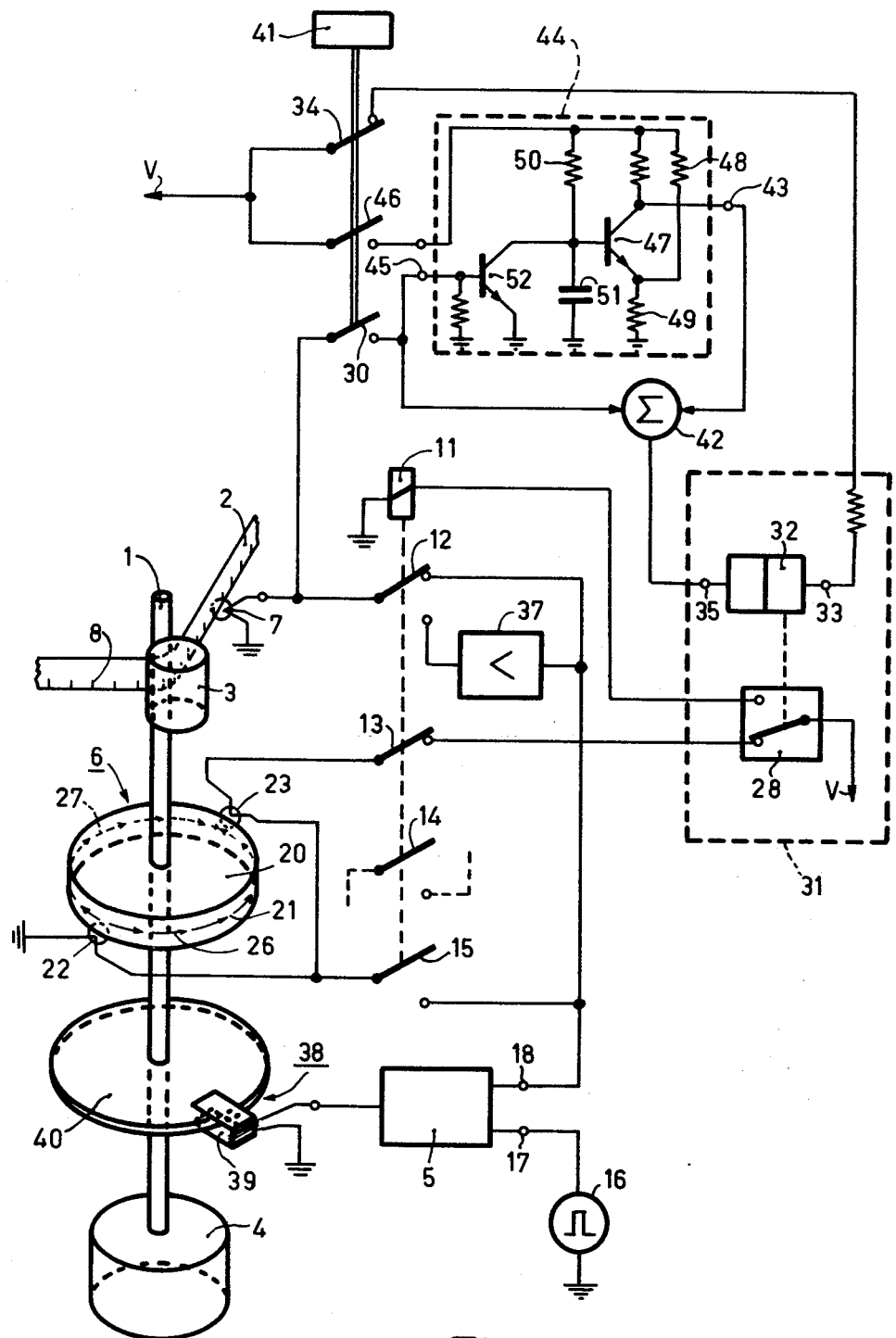
FIG. 3 shows an apparatus in which a recording and a new recording can be started with one and the same control device.

Changing over from the Playback mode represented in FIG. 3 to the Recording mode is again effected with the aid of a relay 11, which operates switches 12, 13, 14 and 15. The relay 11 in the present embodiment is exclusively actuated by the switch 28 of the switching device 31. Thus, only one control 41 is required both for starting an arbitrary recording and a new recording which follows at a certain point, i.e. the two processes are entirely equivalent and a recording is made in the same way as a new recording and vice versa. Accordingly, the same signal is recorded in the synchronization track 8 for both processes, i.e. in this case the variable input signal for the servo system, similarly as during a new recording with the embodiment of FIG. 2. The control 41 again actuates switches 30 and 34 which perform the switching operations required for the switching device 31 at the transition from Playback to Recording. The pulses which are scanned from the synchronization track, when the switch 30 is closed, are applied via an adding device 42 to switching device 31. Furthermore, the output 43 of an equivalent pulse source 44 is connected to the adding device, the pulses scanned from the synchronization track being moreover applied to the input 45 of said pulse source. When a recording is started, the equivalent pulse source is switched on, by connecting it to a d.c. supply voltage V with the aid of a swtich 46 which can be actuated by the control 41.

The equivalent pulse source comprises a transistor 47, whose emitter is connected to a potentiometer 48, 49 and whose base is connected to a series RC-element 50, 51. The emitter-collector path of a further transistor 52 is connected in parallel with the capacitor 51 of the RC-element, the base of said transistor constituting the input of the equivalent pulse source. Upon closure of the switch 46 the transistor 47 receives such an emitter bias that it is cut off, and the capacitor begins to charge until the transistor 47 becomes conductive. When transistor 47 conducts a pulse is supplied to the adding device 42 and to the switching device 31. However, this is only the case when the base of the transistor 52 receives no pulses scanned from the synchronization track, because these pulses each time drive the transistor 52 into conduction, thereby discharging the capacitor 51, and preventing the transistor 47 from being turned on. When a recording is started the equivalent pulse source therefore only supplies pulses to the switching device 31 when no pulses are scanned from the synchronization track 8. This ensures that the switching device 31 and thus the relay 11 are actuated when a recording is made on the record carrier whose synchronization track does not yet contain any pulses.

When starting a new recording, which follows an existing recording at the specific point, the next pulse read from the synchronization track, which appears after closure of the switch 30, ensures that the switching device 31 is actuated, the equivalent pulse source not being rendered operative. For the rest, the entire process is performed in a similar way as described for the previous embodiments. It is evident that the operation of an apparatus according to the present embodiment is extremely simple, because only one control 41 must be actuated, irrespective of whether a new recording is to follow an existing recording at a specific point or whether an arbitrary recording is to be made.

Of course, it would also be possible in the case of a recording and new recording to record the desired signal for the servo system in the synchronization track 8 in a similar manner as with the embodiment of FIG. 1. The reference signal source 16 which supplies the desired signal could also be used as equivalent pulse source, or the equivalent pulse source might for example be equipped with a multivibrator circuit.

It will be obvious that many modifications of the above-mentioned embodiments are possible within the scope of the invention. This applies in particular with respect to the embodiment of the switching device 31, which might for example be designed on the basis of a monostable multivibrator. Similarly, the magnetic head which cooperates with the magnetizable track 21 disposed on the disc 20 of the tachometer 6 might be connected in parallel instead of in series to the direct voltage source in the Playback mode. Alternatively, the magnetizable track 21 might be disposed at a front surface of a part of the rotary system instead of at a surface at the circumference.

What is claimed is:

1. A synchronizing device for an apparatus for recording and playback video signals on a record carrier, comprising a drive shaft for moving the record carrier, a tachometer disc with a closed magnetizable track mounted on said drive shaft, an even number of equidistantly spaced interconnected magnetic heads around said closed magnetizable track, each succeeding magnetic head around said closed magnetizable track being oriented to magnetically polarize when energized the portion of the closed magnetizable track in the vicinity of said succeeding magnetic head in a direction opposite to the direction of a preceeding magnetic head of said interconnected magnetic heads, at least one of said interconnected magnetic heads sensing said magnetic polarizations when in a non-energized state, switching means for selectively establishing a playback mode and a recording mode, synchronization head means for recording video vertical synchronization signals in a synchronization track on the record carrier and for reading said synchronization signals from said synchronization track, a servo system responsive to a reference input and a variable input for controlling the rotational speed of the drive shaft, a reference pulse source, said switching means comprising means for selectively connecting vertical synchronization pulses from a video signal to be recorded or said pulses from said reference pulse source to the reference input of the servo system in said playback mode depending on whether or not the video signal to be recorded is immediately to follow a previously recorded video signal on the record carrier, said switching means further comprising means for connecting said synchronization signals read from said synchronization track to the variable input of said servo system and energizing said interconnected magnetic heads around said closed magnetizable track in said playback mode, said switching means also comprising means responsive to a concurrence of the selection of said recording mode and to the synchronization pulse read from the synchronization track following the selection of said recording mode for de-enerizing said interconnected magnetic heads around said closed magnetizable track, for connecting the synchronization pulses of the video signal to be recorded to the reference input of the servo system and for connecting said at least one of said magnetic heads sensing the polarization of said tachometer disc to said variable input of the servo system.

2. An apparatus as claimed in claim 1, wherein the interconnected magnetic heads and the switching device are connected in series between a direct voltage source and a reference potential and at least one of the the magnetic heads being connected to the reference potential and being employed for supplying the variable signal.

3. An apparatus as claimed in claim 1, wherein at least during a recording mode the variable signal for the servo system is recorded in the synchronization track.

4. An apparatus as claimed in claim 1, wherein a recording and a new recording can be started with the aid of one and the same control device and that for controlling the switching device in addition to the pulses scanned from the synchronization track an equivalent pulse source for said pulses is provided, which source supplies at least one pulse to the switching device when upon starting a recording no pulses are contained in the synchronization track.

* * * * *

UNITED STATES PATENT AND TRADEMARK OFFICE
CERTIFICATE OF CORRECTION

PATENT NO. : 3,946,435
DATED : March 23, 1976
INVENTOR(S) : ERICH LANGER

It is certified that error appears in the above-identified patent and that said Letters Patent are hereby corrected as shown below:

IN THE SPECIFICATION

Col. 1, line 62, cancel "said"; cancel "scanning" and insert --scans--;

Col. 3, line 43, "pulse" should be --pulses--;

Col. 5, line 20, after "stationary" should be --with respect to the magnetic heads--;

Col. 6, line 61, "swtich" should be --switch--;

Signed and Sealed this twenty-ninth Day of June 1976

[SEAL]

Attest:

RUTH C. MASON
Attesting Officer

C. MARSHALL DANN
Commissioner of Patents and Trademarks